United States Patent [19]

Beckman

[11] Patent Number: 5,388,990
[45] Date of Patent: Feb. 14, 1995

[54] VIRTUAL REALITY FLIGHT CONTROL DISPLAY WITH SIX-DEGREE-OF-FREEDOM CONTROLLER AND SPHERICAL ORIENTATION OVERLAY

[75] Inventor: Brian C. Beckman, Renton, Wash.

[73] Assignee: The United States of America as represented by the Administrator of the National Aeronautics and Space Administration, Washington, D.C.

[21] Appl. No.: 56,503

[22] Filed: Apr. 23, 1993

[51] Int. Cl.$^6$ .................... G09B 9/08; G09B 19/16
[52] U.S. Cl. .................... 434/38; 434/43; 434/307 R; 434/372; 364/578; 395/152; 345/8
[58] Field of Search .................... 434/38, 40, 43, 44, 434/307, 308, 372, 307 R; 395/127, 135, 152, 154, 155, 161; 340/686; 358/93, 105, 213.11, 229, 248; 455/89; 364/573, 578; 381/190, 205; 73/379.01, 299, 323; 273/85 G, 433, 434, DIG. 28, 438; 345/8, 9, 121, 161

[56] References Cited

U.S. PATENT DOCUMENTS

| | | | |
|---|---|---|---|
| 3,521,228 | 7/1970 | Congleton et al. | 434/38 X |
| 4,303,394 | 12/1981 | Berke et al. | |
| 4,310,849 | 1/1982 | Glass | |
| 4,348,185 | 9/1982 | Breglia et al. | |
| 4,352,664 | 10/1982 | Morrison et al. | 434/44 X |
| 4,420,808 | 12/1983 | Diamond et al. | 434/45 X |
| 4,457,716 | 7/1984 | Eserhaut et al. | 434/43 |
| 4,487,410 | 12/1984 | Sassak | |
| 4,599,645 | 7/1986 | Brown et al. | 434/38 X |
| 4,634,384 | 1/1987 | Neves et al. | 434/40 X |
| 4,748,441 | 5/1988 | Brzezinski | 345/161 |
| 4,807,158 | 2/1989 | Blanton et al. | 434/43 X |
| 4,845,645 | 7/1989 | Matin et al. | 434/29 X |
| 4,879,556 | 11/1989 | Duimel | 273/438 X |
| 4,984,179 | 1/1991 | Waldern | |
| 4,985,762 | 1/1991 | Smith | |
| 4,988,981 | 1/1991 | Zimmerman et al. | 434/45 X |
| 5,051,094 | 9/1991 | Richter et al. | 434/43 X |
| 5,134,521 | 7/1992 | Lacriox et al. | |
| 5,137,450 | 8/1992 | Thomas | |
| 5,177,872 | 1/1993 | Lewis et al. | 434/307 X |
| 5,185,561 | 2/1993 | Good et al. | 434/45 X |
| 5,210,626 | 5/1993 | Kumayama et al. | 345/9 X |
| 5,228,856 | 7/1993 | Chang et al. | 434/38 X |

FOREIGN PATENT DOCUMENTS 0335030 10/1989 European Pat. Off. ............... 434/38

OTHER PUBLICATIONS

Scientific American, Oct. 1987, "Interfaces for Advanced Computing" by James D. Foley, pp. 127–130, 132, 134, 135.

Virtual Environment Display System, S. S. Fisher, M. McGreevy, J. Humphries, W. Robinett ACM 1986 Workshop on Interactive 3D Graphics, Oct. 23–24, Chapel Hill, North Carolina.

*Primary Examiner*—Richard J. Apley
*Assistant Examiner*—Joe H. Cheng
*Attorney, Agent, or Firm*—John H. Kusmiss; Thomas H. Jones; Guy M. Miller

[57] ABSTRACT

A virtual reality flight control system displays to the pilot the image of a scene surrounding a vehicle or pod having six degrees of freedom of acceleration or velocity control by the pilot and traveling through inertial space, the image itself including a superimposed figure providing the pilot an instant reference of orientation consisting of superimposed sets of geometric figures whose relative orientations provide the pilot an instantaneous feel or sense of orientation changes with respect to some fixed coordinate system. They include a first set of geometric figures whose orientations are fixed to the pilot's vehicle and a second set of geometric figures whose orientations are fixed with respect to a fixed or interstellar coordinate system. The first set of figures is a first set of orthogonal great circles about the three orthogonal axes of the flight vehicle or pod and centered at and surrounding the pilot's head, while the second set of figures is a second set of orthogonal great circles about the three orthogonal axes of a fixed or interstellar coordinate system, also centered at and surrounding the pilot's head.

17 Claims, 6 Drawing Sheets

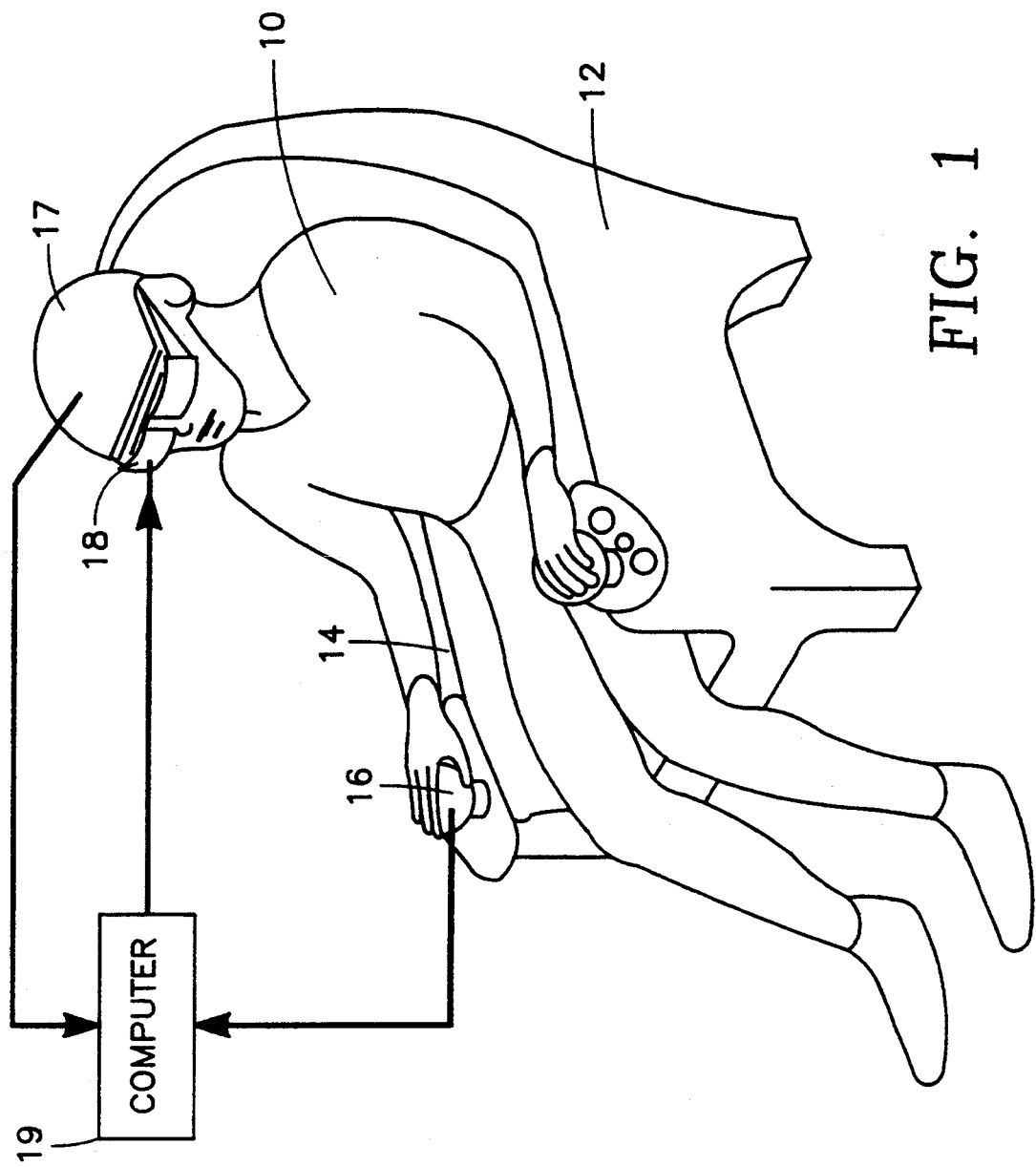

VIRTUAL REALITY FLIGHT CONTROL DISPLAY WITH SIX-DEGREE-OF-FREEDOM CONTROLLER AND SPHERICAL ORIENTATION OVERLAY

BACKGROUND OF THE INVENTION

1. Origin of the Invention

The invention described herein was made in the performance of work under a NASA contract, and is subject to the provisions of Public Law 96-517 (35 USC 202) in which the Contractor has elected not to retain title.

2. Technical Field

The invention is related to virtual reality systems and in particular to the type of virtual reality systems proposed for use in flight simulation and pilot training devices. More specifically, the invention is a flight control system for virtual navigation in inertial space having no ground plane or preferred orientation.

3. Background Art

Virtual reality displays have become practical with the combination of computers and video image processors. Computer-controlled video imaging has led to computerized simulation of images, which in turn has led to simulation of images responsive to user-controlled interactions. In particular, Foley, "Interfaces for Advanced Computing," *Scientific American*, October, 1987, pages 127-134, discloses, for example, the use of a wired glove worn by the computer user and connected to a computer that generates images on a monitor responsive to movements of the glove to give the user the sensation of handling objects, a virtual reality. Fisher et al., "Virtual Environment Display System," *ACM 1986 Workshop on Interactive 3D Displays*, Oct. 23-24, 1986, Chapel Hill, N.C., discloses head-mounted stereoscopic displays controlled by the users movements, such as might be useful in practicing movements required to perform certain tasks. Such virtual reality systems, which typically require supercomputers, were foreshadowed by flight simulators for pilot training, which used ordinary computers to control the image display. Head-mounted, position sensitive displays were shown by D. Engelbart as early as 1962.

Flight simulators of the type employed in aircraft pilot training provide a frame of reference in the image presented to a trainee, dominated by a ground plane, giving the pilot a constant horizontal reference. The flight simulator alters the scene observed by the trainee in accordance with flight control commands from a joy stick controlled by the trainee. This joystick serves the same function in flight simulation as the glove serves in the virtual reality system of the publication by Foley referenced above. The image processing is limited in that the flight movements are treatable as perturbations from horizontal flight.

In one type disclosed in U.S. Pat. No. 5,137,450, a number of video projectors project different perspective views of a scene to different "windows" surrounding the trainee's field of view. In another type disclosed in U.S. Pat. Nos. 5,134,521; 4,985,762; 4,310,849 and 4,348,185, the display is a device very close to the trainee's eyes, facilitating a more realistic panoramic image. In such displays, the image follows the movements of the trainee's head to present a more realistic image.

Flight simulators employing computer-generated images have presented images of targets to be viewed by the trainee oriented in accordance with the pilot's head, as disclosed in U.S. Pat. No. 4,303,394.

Because of the relatively limited movements and rotations simulated by a flight simulator, it is possible to actually move the simulator to simulate many of the accelerations commanded by the trainee, as disclosed in U.S. Pat. No. 4,487,410. Since most accelerations correspond to perturbations from horizontal flight, simulating such accelerations is quite practical. This is comparable in the entertainment field to the Disney-Lucas "Star-Tours" ride at Disneyland.

A corollary of the foregoing is that known flight simulators are not particularly useful for simulating flight beyond earth's atmosphere, and particularly flight through inertial space where there is no preferred "horizontal" direction or horizon. Since there is no particular earth or planetary coordinate system in flight through inertial space by which to define "horizontal", such flight cannot be treated as mere perturbations from a preferred "horizontal" orientation. This is because an entire flight in inertial space might be straight "down" or straight "up" or in an "upside down" orientation with many rotations through 360 degrees, any of which would be beyond the capabilities of a flight simulator. Moreover, if a standard flight simulator were modified for use in simulating flight through inertial space by removing the ground plane or horizon from the simulated image, the trainee would have no reference in the image from which he could reliably discern his orientation and rotations.

This is in fact a fundamental problem in any flight through inertial space, simulated or real: giving the pilot a quick and accurate reference to sense orientation. However, there is no technique known that addresses this problem. For example, U.S. Pat. No. 4,984,179 discloses a computer-generated three-dimensional display that permits the viewer to command rotations about any axis and to view the results in this display, but is not capable of simulating translational movement along more than one axis. Moreover, since this technique implicitly assumes a ground plane or horizon, no provision is made for solving the problem of maintaining in the displayed image a reference of the trainee's orientation in three dimensions.

Suppose a person, the traveller, is immersed in a virtual reality. The virtual reality is made of graphic images synthesized by computer from real or model data and projected into the traveller's eyes by means of binocular, full field-of-view display screens, such as the EyePhones ™ of VPL, Inc. Let us call these, generically, virtual reality displays (VRDs). Naturally, the images may be accompanied by synthesized audio and other media to further enhance the illusion of reality, but the subject here is the images. The projection parameters that determine the apparent parallax, point of view, and gazing direction of the traveller are determined by the virtual reality control system (VRCS). Most proposed or existing VRCS's involve devices that sense the position and orientation of the traveller's head and adjust the projection parameters to maintain the illusion that the traveller is immersed in a real scene. When the traveller turns his head, a new gazing direction is calculated from the new head orientation sensed by the VRCS. Usually, the computed gazing direction is the same that would obtain in a real reality. This maximally real gazing direction most maintains the illusion of reality. Likewise, when the traveller moves around within the sensing range of the VRCS, a new point of view is calculated from the sensed position. Many interesting mappings from the position and orientation sensed by the VRCS to the projection parameters can be used to create a variety of illusions, and such mappings are a fertile ground for experimentation and invention. The subject, here, however, is the sensing of the position and orientation. Let us assume the most straightforward mappings for the time being. The VRCS must repeatedly sense position and orientation, and the rest of the virtual reality system must quickly calculate a new point of view and gazing direction. This must be done quickly enough that the viewer cannot perceive any delay between the instant of movement to a new position and orientation and the instant of display of a new projection using the new point of view and gazing direction, that is, within the persistence threshold of the human visual system. Typically, so long as the delay is less than about 1/30 seconds, the illusion of reality is maintained. The head-sensing control metaphor is adequate for some two-dimensional virtual realities, say walking around a virtual office or moving within a virtual tennis court, but is not adequate, alone, for three-dimensional realities. How is one to fly a virtual airplane, for example, by head movements alone? In the case of airplanes, providing the traveller with a joystick, rudder pedals, and a throttle is probably the best thing to do. Travellers who know how to fly real airplanes will find these controls immediately useful in virtual spaces, and travellers who do not know how to fly will learn something useful for the real world by using these controls. One might, on option, "fudge" the exact metaphor of flight to provide quick, non-physical position changes and play other useful games with the kinematics. However, the airplane metaphor presupposes a horizon or ground plane, so is not fully three-dimensional. Some other control metaphor is required for untethered, free flight in three-dimensional space.

Accordingly, it is an object of the invention to provide an apparatus for displaying to a pilot or trainee the image of a scene surrounding a vehicle traveling in inertial space in response to rotational and translational acceleration commands by the pilot in six degrees of freedom.

It is a further object of the invention to provide a flight control apparatus having six degrees of freedom of acceleration or velocity control by a pilot that displays to the pilot the image of a scene surrounding a vehicle or pod containing the pilot traveling through inertial space, the image itself including a superimposed figure providing the pilot an instant reference of orientation.

It is a related object of the invention to provide a flight control apparatus having six degrees of freedom of acceleration or velocity control by a pilot that displays to the pilot the image of a scene surrounding a vehicle or pod containing the pilot traveling through inertial space, the image itself including a superimposed set of geometric figures whose relative orientations provide the pilot an instantaneous reference of orientation with respect to some fixed coordinate system.

It is a still further object of the invention to provide a virtual reality display corresponding to a flight control apparatus having six degrees of freedom of acceleration or velocity control by a pilot that displays to the pilot the image of a scene surrounding a vehicle or pod containing the pilot traveling through inertial space, the image itself including a superimposed set of geometric figures whose relative orientations provide the pilot an instantaneous reference of orientation with respect to some fixed coordinate system.

It is a related object of the invention to provide such a set of geometric figures superimposed on the scene and apparently surrounding the pilot that include a first set of geometric figures whose orientations are fixed to the pilot's vehicle and a second set of geometric figures whose orientations are fixed with respect to a fixed global, interplanetary or interstellar coordinate system.

It is a yet further object of the invention to provide, in such a virtual reality display, the superimposed set of geometric figures which include a first set of orthogonal great circles about the three orthogonal axes of the flight vehicle or pod and centered at and surrounding the pilot's head and a second set of orthogonal great circles about the three orthogonal axes of a fixed or interstellar coordinate system, also centered at and surrounding the pilot's head.

It is a still further object of the invention to provide, in such a display, tick-markings or off-axis secondary circles at periodic arc lengths along each of the main circles that permit the pilot to instantly gauge approximate angles of rotation about any axis.

It is yet another object of the invention to permit a pilot in such a virtual reality display to instantly scan among a set of velocities for easy navigation in simulated flight.

SUMMARY OF THE DISCLOSURE

The invention is a virtual reality flight control system that displays to the pilot the image of a scene surrounding a virtual vehicle or pod having six degrees of freedom of acceleration or velocity control by the pilot and traveling through inertial space, the image itself including a superimposed figure providing the pilot an instant reference of orientation.

In order to provide such instant reference of orientation to the pilot, the image includes a superimposed set of geometric figures whose relative orientations provide the pilot an instantaneous feel or sense of orientation changes with respect to some fixed coordinate system.

Preferably, such a set of geometric figures is superimposed on the scene observed from the pod or vehicle and apparently surrounds the pilot. They include a first set of geometric figures whose orientations are fixed to the pilot's vehicle and a second set of geometric figures whose orientations are fixed with respect to a global, interplanetary or interstellar coordinate system. The first set of figures is a first set of orthogonal great circles about the three orthogonal axes of the flight vehicle or pod and centered at and surrounding the pilot's head, while the second set of figures is a second set of orthogonal great circles about the three orthogonal axes of a fixed or interstellar coordinate system, also centered at and surrounding the pilot's head. There are tick markings (or off-axis circles) at periodic arc lengths along each of the great circles that permit the pilot to instantly gauge approximate angles of rotation about any axis.

An alternative feature of the invention is a velocity scan option that permits the pilot in such a virtual reality display to instantly scan among a set of velocities for easy navigation in simulated flight.

BRIEF DESCRIPTION OF THE DRAWINGS

FIG. 1 illustrates a virtual traveller in a virtual reality system including a head-worn display and a six-degreeof-freedom control ball employed in carrying out the invention.

DETAILED DESCRIPTION OF THE PREFERRED EMBODIMENT

Figure 3:
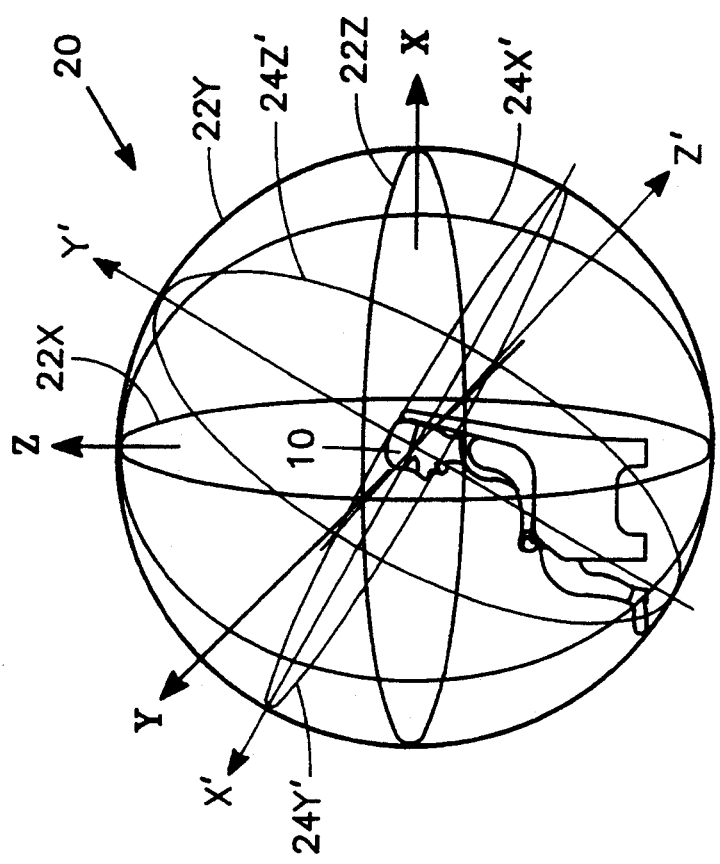
FIG. 3 illustrates the traveller's perception of the virtual reality display of a spherical pod on which are superimposed two sets of orthogonal great circles surrounding the traveller and corresponding to the three orthogonal axes of the pod and of the three orthogonal axes of a fixed or interstellar coordinate system.

Referring to FIG. 1, a traveler through inertial space such as a pilot (in a real space craft) or a trainee (in a room) 10 sits in a chair 12 with a right arm rest 14 on which a six-degree-of-freedom control ball 16 (FIG. 2) is mounted for easy control by the pilot 10. The pilot 10 wears a pilot head rotation sensor 17 and a set binocular full-field-of-view display screens 18. The control ball 16 generates command signals transmitted to a computer 19. The computer 19 produces images which change with movement of the pilot's head (to provide a realistic "surround" image). The computer 19 also changes the images with movement of the pilot's virtual "craft" or pod in response to the command signals from the control ball 16.

Figure 2:
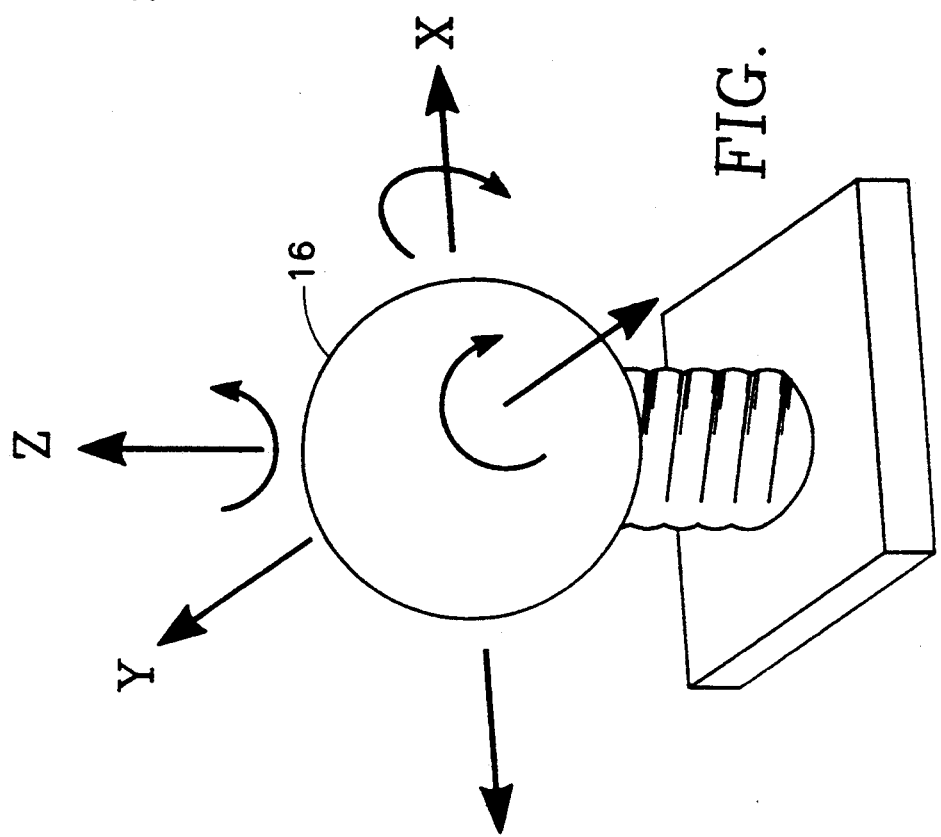
FIG. 2 illustrates a preferred six-degree-of-freedom control ball employed in the system of FIG. 1.

As shown in FIG. 2, the control ball 16 is translatable in two directions along each of three orthogonal axes, labelled X, Y, Z in the drawing, and also rotatable about each one of those axes, the control ball 16 permitting any and all combinations of such translations and rotations to be made simultaneously as the desired.

Let us seat the traveller in a large, comfortable arm chair. The traveller is wearing virtual reality displays. Let us put the control ball 16, which may be the size of a softball, in a hand of the user. The ball 16 is secured to an arm of the chair by an elastic stalk. The stalk is instrumented to pick up displacements and twists in three directions. Hence, each ball furnishes six degrees of freedom of input to the VRCS. Balls like this are commercially available; the SpaceBall ™ is one such. Let us also put three buttons, say A, B, and C on the outside of the arm of the chair so that the traveller can easily strike them simply by removing his hand from the ball and reaching to the outside of the arm without moving his elbow. Let us put a head sensor on the traveller, but suppress the position information from the sensor, using it only to calculate gazing direction from orientation. Now, further suppose that the traveller is moving virtually, for example in interstellar space. How is the traveller to go to a star observed in his field of view? Once nearby and seeing an interesting planetary system to explore, how is the traveller to orient himself to the ecliptic of that planetary system for close-in navigation? The reader will notice that a ground plane is sneaking into the metaphor, but that is not a difficulty; the virtual space pod must also support effective navigation in spaces of dimensionality less than three. It is a fact of Nature that human beings (and other animals) feel more oriented and less "lost" when a ground plane is visible, and the space pod supports control in the presence of one. The distinguishing feature of the space pod is that a ground plane is neither required nor inherent in the system. Let us use the right-hand control.

The first problem is to go to the observed star. Suppose we see the red star about sixty degrees above us and about forty-five degrees to the left. We can move our head and see it. That is where we want to go. We strike button A and space navigation circles are overlayed on the field of stars. The navigation circles are a set of three blue and three yellow circles surrounding the traveller. The circles have major tick marks every thirty degrees, making twelve in all, and minor tick marks every degree. Alternatively, the tick marks may be replace by off-axis circles. The number of marks or off-axis circles per arc degree is programmable or controlled by the pilot. The blue circles are fixed to the global interstellar coordinate system and the yellow circles are fixed to the local space pod coordinate system. These circles allow the traveller to visualize pod orientation quantitatively.

We twist the ball to the left (like the dial of a floor safe combination lock) and back (like the throttle grip of a motorcycle). The yellow navigation circles start to slide within the blue ones and the red star starts to move toward front and center. Simultaneously, we push the ball slightly forward and pull it up a little. That action starts us moving toward the destination star, and we know we are moving because the other stars in the peripheral field of view start to slide past slowly. As the destination star moves more to front and center, we slowly relax the twists on the ball and the springs in the stalk restore it to its resting position. Simultaneously we relax the upward pull on the ball. The star is now directly ahead, and we are pushing the ball forward. The longer we push, the faster we go.

When we have achieved a controllable speed, we relax completely on the ball, and we continue gliding (according to Newton's First Law) toward the star. We twist the ball slightly to the right (like a doorknob) to align the horizontal yellow (pod) navigation circle as closely as possible with the most horizontal-looking blue (space) circle. We see the stars rushing past our peripheral view correspondingly twist helically to the left. We have now achieved the desired orientation. We strike button A again and the navigation circles disappear. The star is now apparently growing in size as we approach. We begin to see several planets orbiting the star. We are about as close as we want to be. We have two options, now. First, we may pull back hard on the control ball, applying maximum braking and eventually coming to rest at the desired distance from the new planetary system. Or, we may strike button C and come abruptly to full stop.

Abruptly stopping is a non-physical motion change; however, we are in virtual reality and we may suspend the laws of physics in various ways. We double-click button C and enter translational scan mode. The word "scan" is discreetly displayed in the peripheral field of view as though part of a heads-up display. In scan mode, the pod responds to ball pushes by translating with a speed, rather than an acceleration, proportional to ball displacement. We still get the motion coherence cues of objects passing by in the peripheral field of view. However, we no longer need to overcome virtual inertia; we are in motion only so long as we are pushing the ball. Scan mode allows us quickly to move to an exact desired position. We double-click C again to exit scan mode. We strike button B to see the yellow pod navigation circles overlayed with red circles, this time. The red circles are aligned with the planetary coordinate system.

The foregoing scenario presents what seems a very natural navigation metaphor that could be easily mastered with a little practice. It implies the algorithms necessary to map signals from the control ball to coordinate transformations. In normal mode, translational control signals map to translational accelerations. So long as a translational input from the ball is present, a proportional acceleration is delivered to the local pod coordinate system with respect to the global space coordinate system. Velocity accumulates independently in each coordinate direction. When the translational degrees of freedom of the ball are relaxed, motion continues according to the velocity that has accumulated. Thus, translation is consistent with Newton's First Law of Motion (a body in motion in a straight line continues in motion until acted upon by an external force). Translational motion changes only when the ball is pushed and the pod coordinate system is accelerated.

Alternatively, one might imagine that the translational degree of freedom of the ball control virtual rockets attached to the pod, in which case the acceleration follows from Newton's Second Law of Motion F=ma with the mass, m, of the pod being a parameter to the algorithm. In scan mode, ball input maps to translational velocity rather than acceleration. When the ball is relaxed, motion stops, non-physically. Rotational (twist) control signals map to rotational velocities. So long as a rotational input from the ball is present, a proportional velocity is delivered to the local pod coordinate system with respect to the global space coordinate system. When the rotational degrees of freedom of the ball are relaxed, rotational motion of the pod stops and the acquired orientation obtains. One might imagine that the rotational degrees of freedom of the ball control virtual gimbal motors. The virtual gimbals are anchored to the global coordinate system by virtual gyroscopes. One might easily imagine that a more physical spin mode, in which rotational degrees of freedom are mapped to rotational accelerations, might be useful. Switching among the modes should be under user control. Software provides for all modes and maintains consistency across mode switches.

Figure 4:
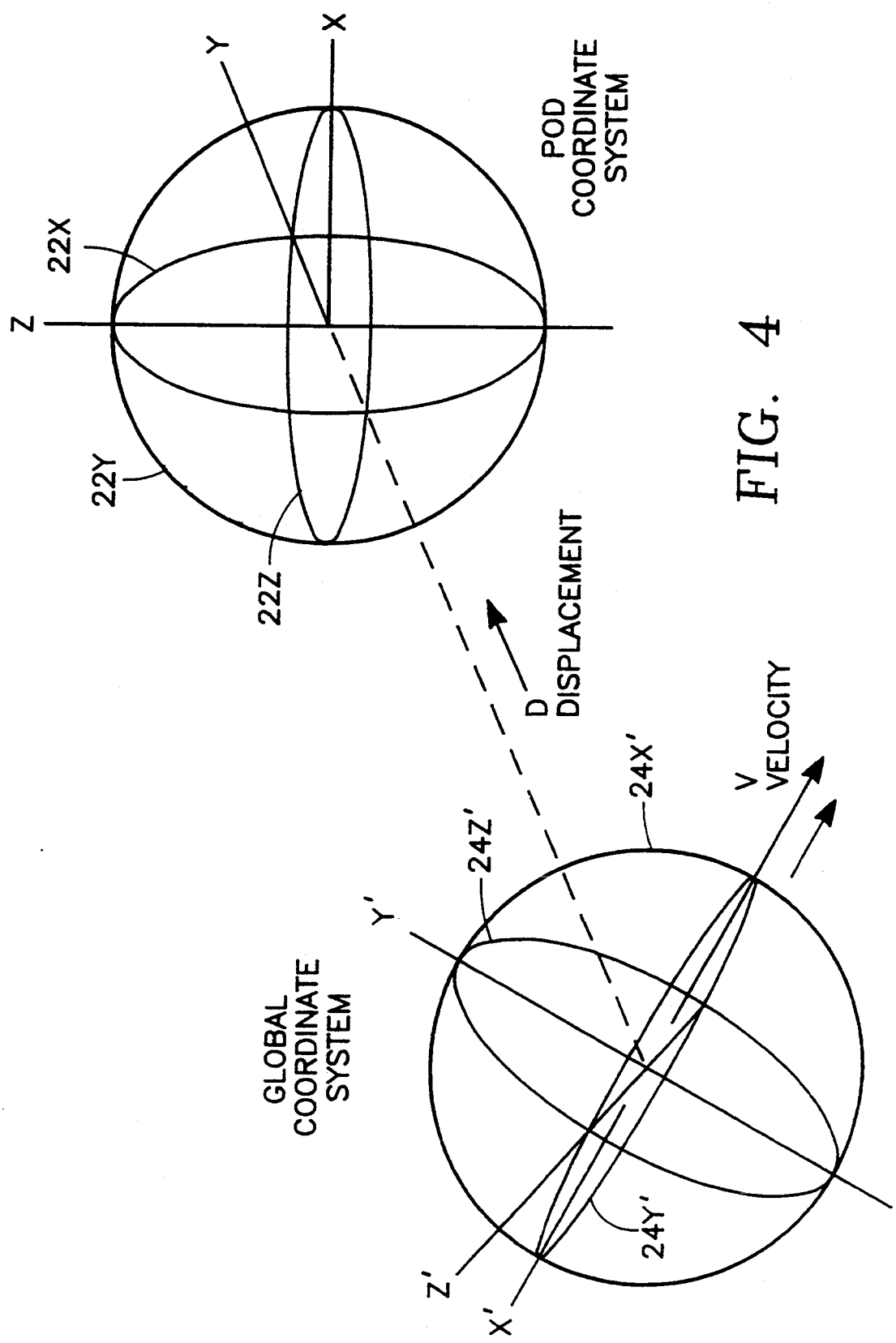
FIG. 4 illustrates the two sets of great circles of FIG. 3 separately.

FIG. 3 illustrates the traveller's perception of the two sets of circles superimposed on the observed scene. The traveller 10 is apparently surrounded by a sphere 20 on which is fixed three co-spherical yellow orthogonal circles. The sphere 20 corresponds to the traveller's space pod centered on the three orthogonal axes X, Y, Z of the space pod and the three yellow circles 22x, 22y, 22z have as their axes the three orthogonal axes of the space pod. The three orthogonal blue circles 24x', 24y', 24z', also co-spherical with the sphere 20, have as their axes the three orthogonal axes X', Y', Z' of a global or interstellar coordinate system defined prior to "take off". The global circles are parallel to the global coordinate system. Both sets of circles are centered at the center of the sphere 20, the blue circles of course being translated from the true origin of the global coordinate system by translational movement of the pod and traveller 10 to keep those circles concentric with the sphere 20. The traveller 10 perceives that the yellow circles are stationary, while the blue circles appear move about with rotations of the pod. FIG. 4 illustrates the two sets of circles 22, 24 separated from one another by the displacement vector D reflecting the displacement of the coordinate system X, Y, Z of the pod or sphere 20 from the origin of the global, interstellar or galactic coordinate system X', Y', Z'. The pod coordinate system X, Y, Z moves with a velocity vector V relative to the global coordinate system.

FIG. 4 illustrates how off-axis circles 25 may be superimposed on the great navigational circles 22 in the manner of degree tick marks. There are three orthogonal sets of off-axis circles, one set for each of the three orthogonal great navigational circles 22X, 22Y, 22Z. When the pod and global great navigational circles are superimposed together as in FIG. 3, then there are six sets of off-axis circles available to the pilot. The presence, intensity and transparency of the great navigational circles as well as of the off-axis circles 25 is controlled by the user through a second (left) control ball 16' shown in FIG. 1. The user can select any one or all of the six great navigational circles 22 and anyone or all of the six sets of off-axis circles to be displayed or not displayed at any time through the second control ball 16'. The second control ball 16' also permits the user to control the number of off-axis circles per degree of arc.

Figure 5:
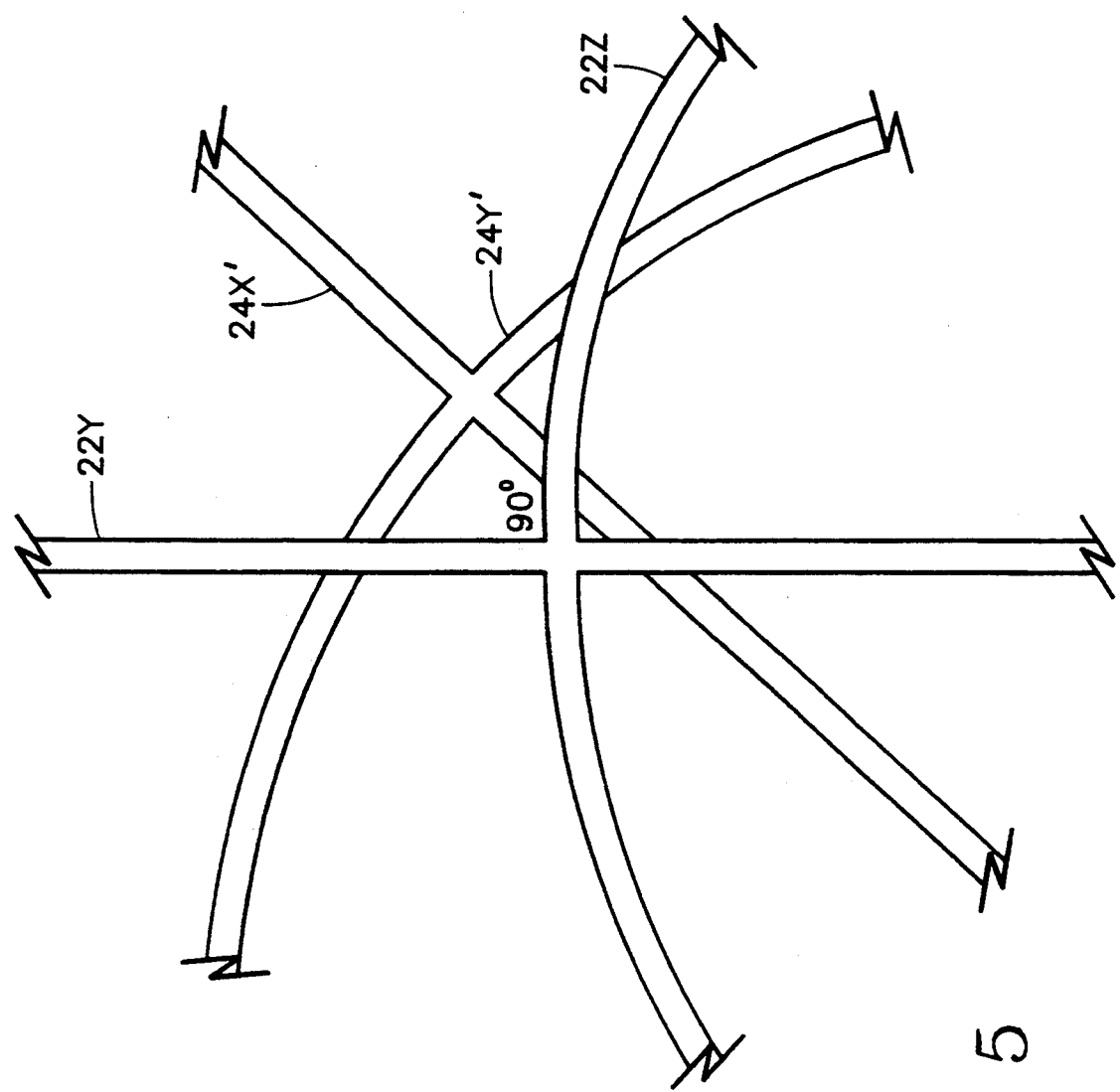
FIG. 5 illustrates how the two sets of great circles may appear in one view of the traveller.

The advantage is that as the pod rotates in response to commands from the traveller through the control ball 16, the traveller can continue gazing at the surrounding scene while simultaneously feeling the magnitude and direction of rotations of the pod. The pilot perceives translational movement of the pod by the passage of scenery across his field of vision. FIG. 5 illustrates how the two sets of circles appear through one narrow field of view of the traveller in a particular orientation of the pod reflecting random rotation about multiple axes. In order to enhance the pilot's instantaneous feel of orientation changes, each of the circles 22, 24 has period markings every so many degrees. For example, large marks are placed every 45 degrees while smaller markings are placed every five degrees.

Figure 6:
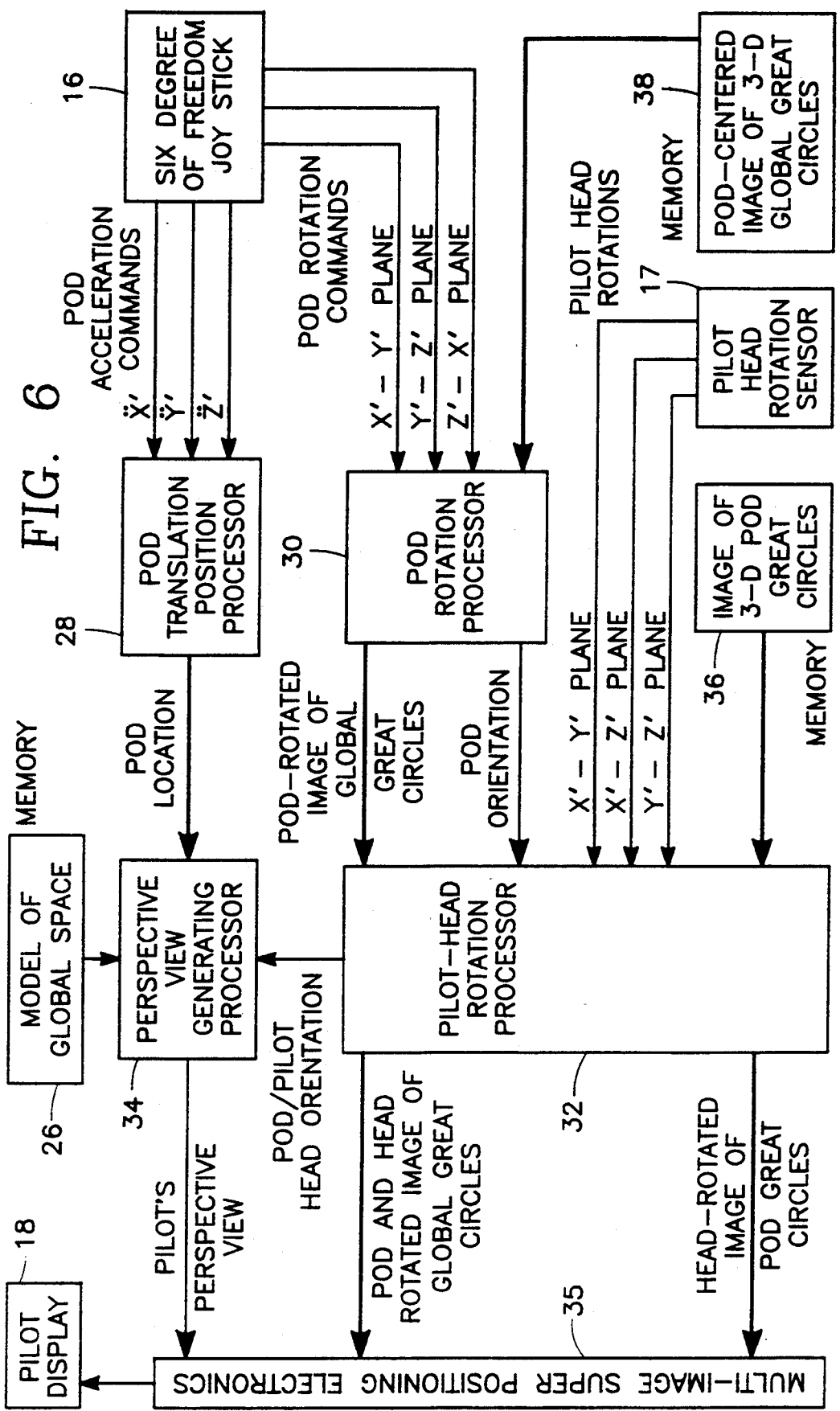
FIG. 6 is a block diagram illustrating the architecture of the virtual reality flight control system of the invention.

FIG. 6 illustrates the architecture of the computer 19 and its interfaces with the control ball 16, the pilot head rotation sensor 17 and the pilot display 18.

A memory 26 stores a model of the environment (global, oceanic space, interplanetary or interstellar) through which the pod is to travel. Such a model comprises information defining relative locations of objects (e.g., galaxies, stars and planets), the surface images of those objects, their relative velocities in the galactic coordinate system, etc. Such informational models are of the type that have been generated by computers using images (radar and photographic) from interplanetary vehicles such as Galileo and Voyager.

A pod translation/position processor 28 employs conventional dynamic algorithms to continuously compute and update the position and velocity of the pod from pod acceleration commands received from the control ball 16 (or any equivalent six-degree-of-freedom joy stick).

A pod rotation processor 30 employs conventional dynamic algorithms to continuously compute and update the rotational orientation and rotational velocity of the pod from pod rotational acceleration commands received from the control ball 16.

A pilot head rotation processor 32 employs conventional dynamic algorithms to continuously compute and update the rotational orientation of the pilot's head relative to the pod coordinate system from rotational position or velocity data received from the pilot head rotation sensor 17. A vector defining the pod orientation in the galactic coordinate system is computed by the pod rotation processor 30 and transmitted to the pilot head rotation processor. The pilot head rotation processor modifies this vector to produce a vector defining the pilot head orientation in galactic coordinates. This vector defines the direction of the pilot's perspective view of galactic space, and is transmitted by the pilot head rotation processor to a perspective view generating processor 34. The operation of the two rotation processors 30, 32 may be thought of as two successive rotation matrix multiplications or transformations of a vector defining the perspective view direction, namely a first rotation in accordance with the pod's current orientation and a second rotation in accordance with the pilot's head orientation. This is necessary because, even if the pod does not rotate, the image presented to the pilot must change to reflect rotations of the pilot's head. Another conventional approach is to use homogeneous coordinates, combining translation and rotation in one 4-by-4 matrix product.

From the galactic position of the pod computed by the pod translation/position processor 28, and the pilot head orientation relative to galactic space computed by the pod rotation and pilot head rotation processors 30, 32, the perspective view generating processor 34 computes, from the model 26 of galactic space, the pilot's perspective view of galactic space, using, for example, image processing software demonstrated at the Jet Propulsion Laboratories in Pasadena, Calif. Perspective computations are available in graphics processor hardware or can be quickly done in software. In this perspective view, of course, objects closest to the pod appear relatively large while objects farther away appear smaller, and objects approaching infinity appear to converge along lines of perspective, much like the proverbial railroad tracks on a flat landscape.

The perspective view generating processor 34 transmits the pilot's perspective view of space to multi-image superpositioning electronics 35.

In order to generate the image of the three orthogonal circles 22x, 22y, 22z fixed to the pod coordinate system, a memory 36 stores the image viewed from the center of the sphere 20 of the three circles 22 apparently fixed to the virtual sphere 20 surrounding the pilot 10. The pilot head rotation processor 32 rotates the image of the circles 22 so as to present the correct portion thereof to the pilot's relatively narrow field of view, depending upon the current orientation of the pilot's head. This produces a head-rotated image of the pod great circles, which is transmitted to the multi-image superpositioning electronics 35.

In order to generate the image of the three orthogonal circles 24 oriented with the galactic coordinate system (but co-spherical on the sphere 20), a memory 38 stores the image of the three orthogonal circles 24 viewed from the center of the sphere 20. Since the circles 24 are of a fixed orientation relative to the galactic coordinate system, their image must move with all rotations of the pod or sphere 20. Therefore, the image stored in the memory 38 is transmitted to the pod rotation processor 30 for rotation thereof in accordance with rotations of the pod. The resulting pod-rotated image of the three orthogonal circles is transmitted to the pilot head rotation processor 32 for rotation with the pilot's head. The resulting rotated image is of a portion of the three circles 24 encompassed by the pilot's relatively narrow field of view and corresponding to the pilot head current orientation in galactic coordinates. This final rotated image of the three circles 24 is transmitted to the multi-image superpositioning electronics 35.

The superpositioning electronics 35, which may be an image processor, assigns a yellow color to the image of the three circles 22 and a blue color to the image of the three circles 24 and superimposes these images onto the image of the pilot's perspective view of galactic space to generate a superimposed image of the pilot's perspective view through the transparent sphere 20 defined by six great circles co-spherical with the sphere 20, namely the three yellow circles 22x, 22y, 22z and the three blue circles 24x', 24y', 24z'. This final image is transmitted to the pilot binocular display 18.

Using well-known techniques, the superpositioning electronics may generate two versions of the image stereoscopically displayed to the pilot's eyes by respective right and left eye displays in the display 18, in accordance with a true stereoscopic image. Preferably, the yellow and blue navigation circles are transparent images which do not obscure any objects in the pilot's field of view. For this purpose, the superpositioning electronics 35 employs alpha-blending in accordance with well-known techniques to compute the transparent images of the yellow and blue navigational circles. The superpositioning electronics 35 also responds to commands from the second control ball 16' to add or delete or vary the intensity or transparency of the off-axis circles 25 of any one or all of the two sets of orthogonal great navigational circles 22 and to change the number of off-axis circles per degree of arc, or to shorten the off-axis circles 25 to small degree tick marks, using appropriate conventional image display techniques.

In order to realistically follow pilot head movements and pod movements, the image presented by the pilot display 18 must be periodically updated very rapidly. This requires that the entire system compute a new image for display rapidly in accordance with the latest changes in commanded translational and rotational accelerations from the control ball 16 and in accordance with changes in pilot head orientation sensed by the pilot head sensor 17. Thus, each binocular display in the pilot display 18 receives a new "video frame" at a very rapid rate, preferably greater than the convention television frame rate of 30 frames per second. For this purpose, the processors in the system of FIG. 6 are of the highest power and speed.

Figure 7:
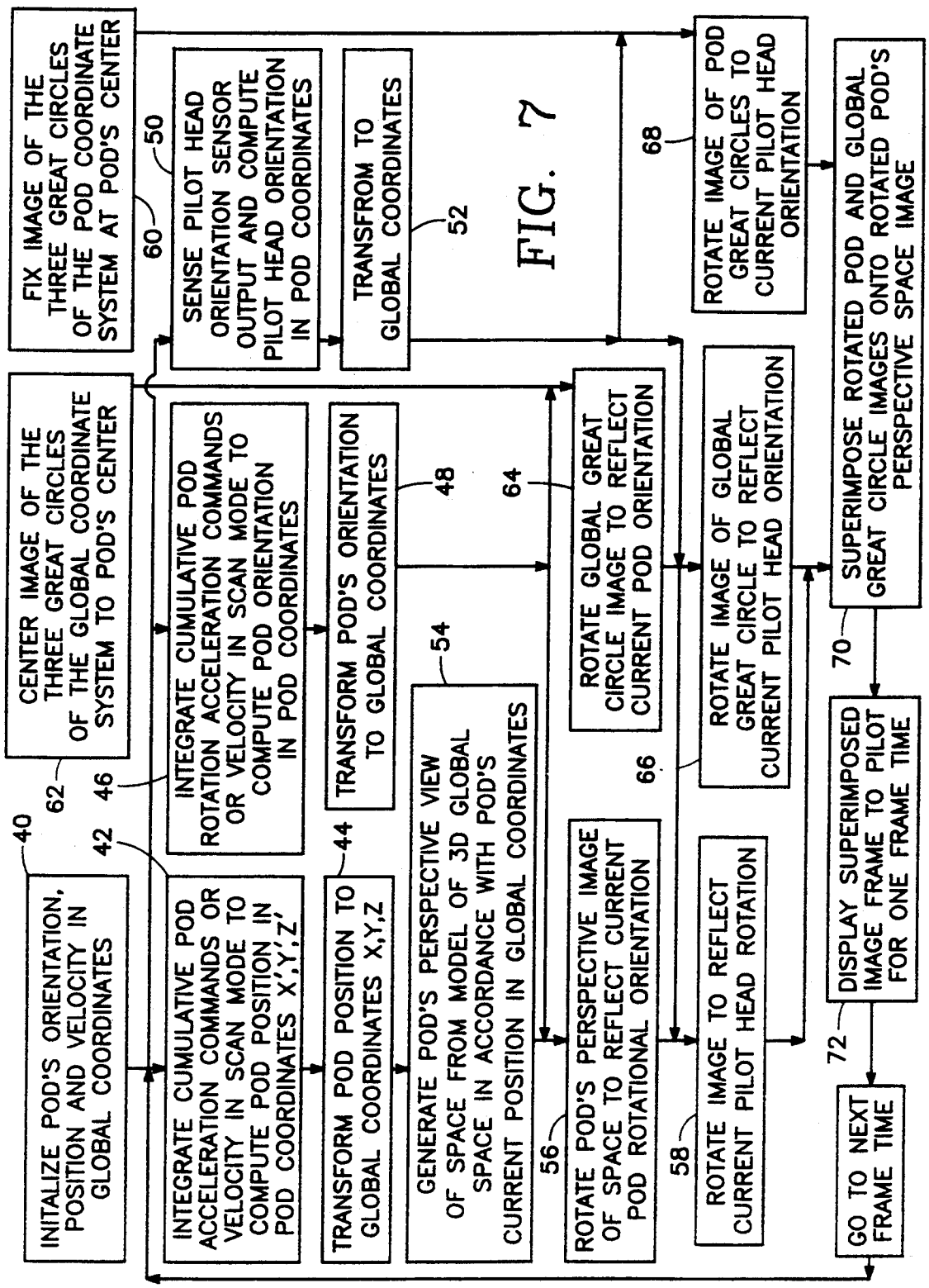
FIG. 7 is a block flow diagram illustrating the operation of the system of FIG. 6.

How the system of FIG. 6 operates is illustrated in the flow diagram of FIG. 7. The first step (block 40 of FIG. 7) is to initialize or define the location and orientation of the pod coordinate system X, Y, Z relative to the galactic coordinate system X', Y', Z'. Next, the pod translation/position processor 28 integrates pod translational accelerations commanded by the control ball 16 to compute a new position of the pod or sphere 20 (block 42 of FIG. 7). This position is transformed to galactic coordinates (block 44 of FIG. 7). The pod rotation processor 30 integrates pod rotational accelerations commanded by the control ball 16 to compute a new pod orientation (block 46 of FIG. 7). This orientation is transformed to galactic coordinates (block 48 of FIG. 7). The pilot head rotation processor 32 integrates changes in the pilot head orientation sensed by the pilot head rotation sensor 17 and computes a new orientation of the pilot's head in pod coordinates (block 50 of FIG.

7). This new pilot head orientation is transformed to galactic coordinates (block 52 of FIG. 7).

The perspective view generating processor 34 then generates the pilot's perspective view of galactic space from the model 26 based upon the pod's current position (block 54), any changes in the pod's orientation (block 56) and any changes in the orientation of the pilot's head (block 58 of FIG. 7).

Prior to initialization, the memory 38 stores data defining the image of the three orthogonal circles 22 fixed to the pod coordinate system and centered at the pod coordinate axis origin at the center of the virtual sphere 20 (block 60 of FIG. 7). For this purpose, image pixels in the memory 38 are best defined in spherical coordinates. Prior to initialization, the memory 36 stores data defining the image of the three orthogonal circles 24 fixed to the galactic coordinate system but centered at the origin of the pod coordinate system at the center of the sphere 20 (block 62 of FIG. 7). For this purpose, the image pixels in the memory 36 are best defined in spherical coordinates.

After the step of block 48, the pod rotation processor 30 rotates the image from the memory 38 of the three orthogonal circles 24 fixed to the galactic coordinate system in accordance with the latest rotation of the pod relative to galactic coordinates (block 64 of FIG. 7). The pilot head rotation processor 32 then rotates the pod-rotated image of the circles 24 (block 66 of FIG. 7) in accordance with the current pilot head orientation. Also, the pilot head rotation processor 32 rotates the image of the circles 22 in accordance with the current pilot head orientation (block 68 of FIG. 7). The rotated images of the circles 22, 24 are superimposed onto the pilot perspective view of the scene by the display electronics 35 (block 70 of FIG. 7) and the resulting image is displayed by the display 18 as the next video frame (block 72 of FIG. 7). The system then restarts the entire process at the steps of blocks 42, 46 and 50 to produce the next video frame.

While the invention has been described in detail by specific references to preferred embodiments, it is understood that variations and modifications thereof may be made without departing from the true spirit and scope of the invention.

What is claimed is:

1. An apparatus for displaying to a user the image of a scene surrounding a vehicle traveling in inertial space in response to rotational and translational acceleration commands by the user in six degrees of freedom, the apparatus comprising:
   a full-field-of-view display for displaying said image of the scene surrounding the vehicle to the user;
   means for producing images on said full-field-of-view display, said images changing to correspond to a new perspective of the user in response to said rotational and translational acceleration commands by the user in six-degrees-of-freedom;
   means for the user to impart said rotational and translational acceleration commands to said image producing means; and
   means for superimposing on said image a superimposed figure providing the user an instant reference of rotational orientation wherein said image is free of a ground plane, thereby assisting said user preforming the appropriate navigation in the inertial space.

2. The apparatus of claim 1 wherein said superimposed image comprises a superimposed set of geometric figures whose relative orientations provide the user an instantaneous reference of orientation with respect to a fixed coordinate system.

3. The apparatus of claim 2 wherein said set of geometric figures apparently surround the user.

4. The apparatus of claim 3 wherein the set of geometric figures superimposed on the scene and apparently surrounding the user include a first set of geometric figures whose orientations are fixed to the user's vehicle and a second set of geometric figures whose orientations are fixed with respect to a reference coordinate system.

5. The apparatus of claim 4 wherein the first set of geometric figures comprise a first set of orthogonal great circles about three orthogonal axes of the flight vehicle and wherein the second set of geometric figures comprises a second set of orthogonal great circles about the three orthogonal axes of said reference coordinate system.

6. The apparatus of claim 5 wherein all of said circles are concentric with a virtual sphere corresponding to said vehicle and centered at the user's head.

7. The apparatus of claim 6 wherein said images of said circles further comprise markings at periodic arc lengths along each of the circles which permit the user to instantly gauge approximate angles of rotation about any axis, said marking being one of: (a) degree tick marks, or (b) off-axis circles distributed along the axes of each coordinate system at periodic intervals.

8. The apparatus of claim 1 further comprising means for permitting the user to scan among a set of simulated velocity images for easy navigation in simulated flight of a non-physical changing motion training exercise.

9. A flight control apparatus for displaying to a user the image of a scene surrounding a vehicle traveling in inertial space comprising:
   means for imparting six-degree-of-freedom of motion control by said user;
   means for displaying to the user the image of a scene surrounding a vehicle containing the user traveling through inertial space from commands transmitted by said means for imparting six-degree-of-freedom of motion control; and
   means for superimposing on said image a superimposed figure providing the user an instant reference of rotational orientation wherein said image is free of a ground plane, thereby assisting said user preforming the appropriate navigation in the inertial space.

10. The apparatus of claim 9 wherein said superimposed image comprises a superimposed set of geometric figures whose relative orientations provide the user an instantaneous reference of orientation with respect to one of a plurality of coordinate systems.

11. The apparatus of claim 10 wherein said set of geometric figures apparently surround the user.

12. The apparatus of claim 11 wherein the set of geometric figures superimposed on the scene and apparently surrounding the user include a first set of geometric figures whose orientations are fixed to the user's vehicle and a second set of geometric figures whose orientations are fixed with respect to a reference coordinate system.

13. The apparatus of claim 12 wherein the first set of geometric figures comprise a first set of orthogonal great circles about three orthogonal axes of the flight vehicle and wherein the second set of geometric figures comprises a second set of orthogonal great circles about the three orthogonal axes of said reference coordinate system.

14. The apparatus of claim 13 wherein all of said circles are concentric with a virtual sphere corresponding to said vehicle and centered at the user's head.

15. The apparatus of claim 14 wherein said images of said circles further comprise markings at periodic arc lengths along each of the circles which permit the user to instantly gauge approximate angles of rotation about any axis.

16. The apparatus of claim 15 wherein said means for imparting six-degree-of-freedom motion control comprises a control ball moveable in six degrees of freedom and connected to said means for displaying and a secondary control ball connected to said means for displaying for controlling parameters of said great circles including at least one of transparency, intensity, presence, and pitch of said markings along said great circles.

17. The apparatus of claim 16 wherein said means for displaying comprises:
  means for storing a model defining said inertial space and locations and appearances of objects therein;
  means for computing translational and rotational positions of said user in said inertial space from commands transmitted by said means for imparting six-degree-of-freedom motion control, and
  means for producing from said translational and rotational positions and from said model an image of a perspective view of said inertial space as observed from a vantage point of said user.

* * * * *